United States Patent [19]
Hsu et al.

[11] Patent Number: 5,914,552
[45] Date of Patent: Jun. 22, 1999

[54] METHOD AND APPARATUS FOR ASSEMBLING PERMANENT MAGNET ROTORS

[75] Inventors: John S. Hsu, Oak Ridge; Donald J. Adams, Knoxville, both of Tenn.

[73] Assignee: Lockheed Martin Energy Research Corporation, Oak Ridge, Tenn.

[21] Appl. No.: 08/929,540

[22] Filed: Sep. 15, 1997

[51] Int. Cl.⁶ .................................................. H02K 1/28
[52] U.S. Cl. ............................................................ 310/156
[58] Field of Search .................................. 310/156, 216, 310/218, 42; 29/596, 598

[56] References Cited

U.S. PATENT DOCUMENTS

| | | | |
|---|---|---|---|
| 4,242,610 | 12/1980 | McCarty et al. | 310/156 |
| 5,510,662 | 4/1996 | Tanimoto et al. | 310/156 |
| 5,604,390 | 2/1997 | Ackermann | 310/156 |

*Primary Examiner*—Nestor Ramirez
*Assistant Examiner*—Burton S Mullins
*Attorney, Agent, or Firm*—Quarles & Brady LLP

[57] ABSTRACT

A permanent magnet assembly (22) for assembly in large permanent magnet (PM) motors and generators includes a two-piece carrier (23, 24) that can be slid into a slot (13) in the rotor (10) and then secured in place using a set screw (37). The invention also provides an auxiliary carrier device (50) with guide rails (51) that line up with the teeth (12) of the rotor, so that a permanent magnet assembly (22) can be pushed first into a slot (13), and then down the slot (13) to its proper location. An auxiliary tool (50) is provided to move the permanent magnet assembly (22) into position in the slot (13) before it is secured in place. Methods of assembling and disassembling the magnet assemblies (22) in the rotor (10) are also disclosed.

6 Claims, 1 Drawing Sheet

5,914,552

METHOD AND APPARATUS FOR ASSEMBLING PERMANENT MAGNET ROTORS

STATEMENT REGARDING FEDERALLY SPONSORED RESEARCH

This invention was made with Government support under Contract No. DE-AC05-840R21400 awarded by the U.S. Dept. of Energy. The Government has certain rights in the invention.

TECHNICAL FIELD

The field of the invention is methods and apparatus for assembling permanent magnet (PM) electric motors, generators and similar equipment.

DESCRIPTION OF THE BACKGROUND ART

A permanent magnet motor generally comprises a rotor with an even number of equally spaced, alternating polarity magnets situated around a periphery of the rotor, and a stator that holds a number of windings positioned around the rotor. DC current in the stator windings provides an electromagnetic field and the permanent magnets cause the rotor to move to align the magnetic forces produced by the magnets and the field.

A thin peripheral band is fitted over the rotor and magnets to reduce the flux harmonics in the air gap between the rotor and the stator.

An example of a permanent magnet generator using wedge-shaped permanent magnets is disclosed in U.S. Pat. No. 4,242,610. In this patent, the permanent magnets have a wedge angle which is critical to retaining the magnets in their slots.

Large permanent magnet rotors have diameters as large as three meters (3 m), which raise special problems in assembly, which are not resolved by the prior art.

First, handling the permanent magnet elements give rise to large undesirable magnetic forces. There is a need for additional tools to position the magnet elements during assembly and disassembly.

Second, an improved construction is needed for holding the magnets in place in large motors, once the rotors have been assembled.

The invention has been made to solve these problems, as well as to provide additional advantages.

SUMMARY OF THE INVENTION

The invention provides a method and apparatus for handling large magnets assembled in large numbers into large rotors.

An improved construction of a permanent magnet assembly is provided for holding the magnets in place on the rotor. The assembly includes a multiple-piece carrier that can be slid into a slot in the rotor and then secured in place using a set screw to tighten the carrier. The carrier provides a sure interengagement with the slot, without the need for judging a critical angle.

The invention also provides an auxiliary loading device with guide rails that line up with the teeth of the rotor, so that each magnet assembly can be pushed first into a slot, and then down the slot to the proper location. An auxiliary driver is used to operate the set screw and secure the carrier in place, thus positioning the magnet.

The method of the invention includes the steps of aligning the auxiliary carrier with the rotor slots with the auxiliary carrier carrying at least one permanent magnet assembly in an unsecured and slidable condition, pushing the magnet assembly into place in a corresponding rotor slot, and operating the set screw to secure the permanent magnet assembly in place.

One object of the invention is to position large permanent magnet elements without the loss of control of the magnet element due to large undesirable magnetic forces. The invention maintains the magnet element or element assembly in a desired orientation and permits only one degree of freedom to insert the magnet into the rotor.

Still another object of the invention is to provide a kit for assembling a permanent magnet rotor.

Another object of the invention is to provide a method that can also be practiced in disassembly of larger PM rotors.

Other objects and advantages, besides those discussed above, will be apparent to those of ordinary skill in the art from the description of the preferred embodiment which follows. In the description, reference is made to the accompanying drawings, which form a part hereof, and which illustrate examples of the invention. Such examples, however, are not exhaustive of the various embodiments of the invention, and, therefore, reference is made to the following claims which follow the description for determining the scope of the invention.

DETAILED DESCRIPTION OF THE PREFERRED EMBODIMENT

Figure 1:
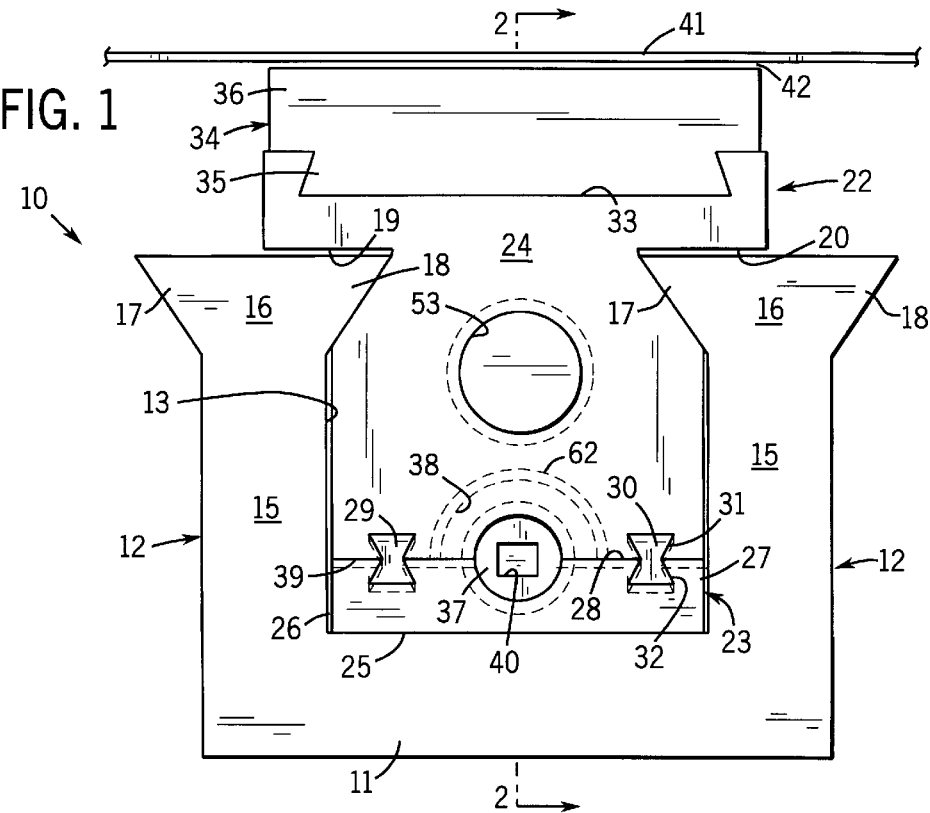
FIG. 1 is a detail end view of a motor showing the permanent magnet assembly of the present invention.

Referring to FIG. 1, a rotor 10 of a permanent magnet motor has a cylindrical core 11 and a plurality of teeth 12 extending radially from the core 11. Between each pair of teeth is a slot 13. Although the rotor 10 is cylindrical, there are a sufficient number of teeth 12 and slots 13, that the rotor 10 would have only a gradual arc of curvature, and therefore, for purposes of simplifying the drawing in FIG. 1, the inner perimeter of the core 11 between the teeth 12 has been shown as being essentially straight with it being understood, that it would, in fact, be slightly curved.

The teeth 12 run longitudinally in the direction of the axis of rotation of the rotor 10, and have a stem portion 15 that forms walls on opposite sides which become the walls of a pair of adjacent slots 13. The teeth 12 further form a rail portion 16 on top of the stem portion 15 which, as seen from the end view, is a dovetail with oppositely directed tenons 17, 18. These tenons 17, 18 are received in mortised grooves 19, 20 formed in the carrier for the permanent magnet assembly 22.

The assembly 22 includes the carrier, which is formed of two primary pieces, a base 23 and a magnet holding body 24. The base 23 has a flat bottom 25, flat, upright sidewalls 26 and 27 rising from the bottom 25, and a sloped top surface 28.

This sloped top surface 28 of the base 23 meets a sloped bottom surface 39 of the magnet holding body 39 that angles downward from the outer end of the assembly 22 seen in FIG. 1 to the inner end of the assembly 22. The magnet holding body 24 rises above the tops of the teeth 12 where a relatively wider mortised groove 33 is formed to received the permanent magnet 34 which is formed with a dovetailed bottom portion 35 and an upper portion 36 of rectangular cross section.

A locking mechanism for the permanent magnet assembly 22 is provided by a set screw 37. The set screw 37 (FIG. 2) has a plurality of threaded sections 61 that alternate with circumferential grooves 60. Hanging from the body 24 are projections 66 which are received in the grooves 60. In assembling the assembly 22, the set screw 37 is threaded into a bore 38, formed in part by threaded loops 62 formed on the base 23, with the threaded sections 61 becoming engaged within respective loops 62. The body 24 is then placed on the base 23 with the projections 66 being received in grooves 60. The body 24 is then coupled to the base by two double dovetail rails 29, 30, which are received in corresponding pairs of opposed mortised grooves 31, 32 in the base 23 and body 24, respectively, which are of reciprocal shape (keyed) to the rails 29, 30.

Figure 2:
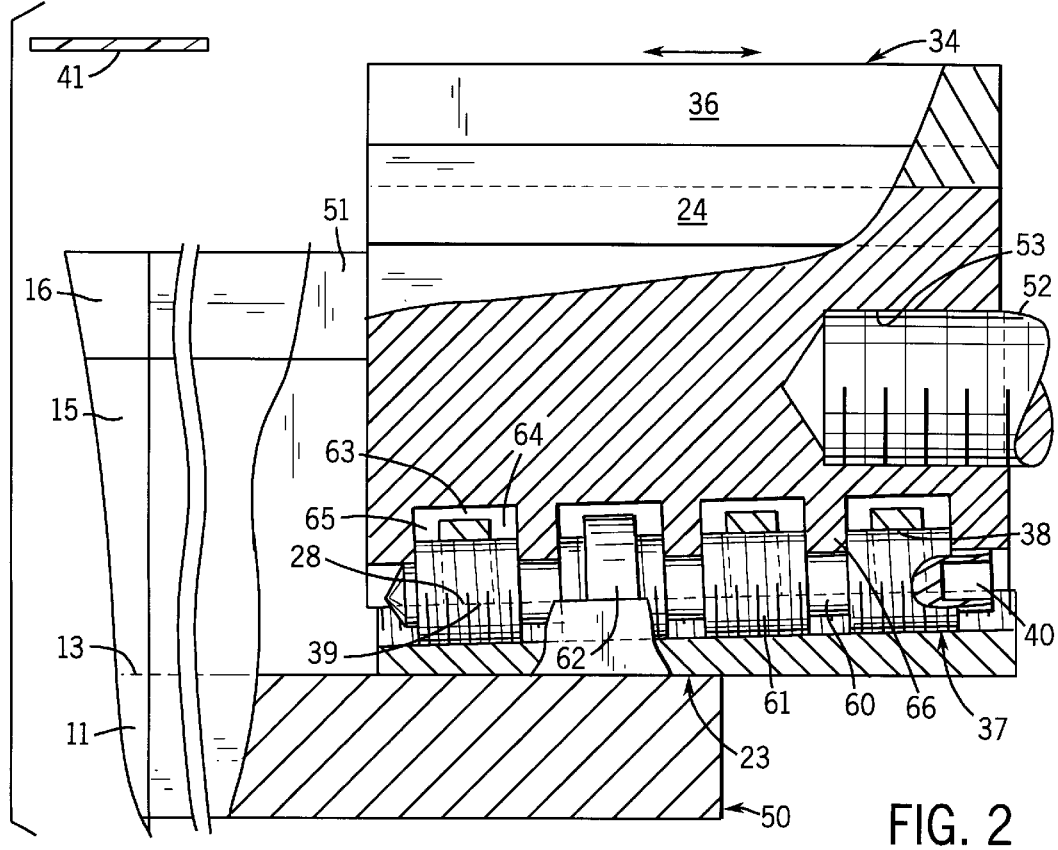
FIG. 2 is a sectional view taken in the plane indicated by line 2—2 in FIG. 1, showing a method of assembly and a method of disassembly according to the present invention.

Once assembled in this manner, the screw 37 can be operated to move axially a distance equal to the width of slots 63 less the width of the loops 62, which equals the width of gaps 64, 65 in FIG. 2. The advance or retraction of the screw 37 adjusts the position of the body 24 and magnet 34 relative to the base 23, and also adjusts the radial depth of the body 24 in the slot 13, due to the downward slope of surfaces 28, 39. As the body 24 is moved radially deeper into the slot 13, the upper portion is clamped down onto the rotor teeth 16 to hold the assembly 22 in its axial position in the rotor slot 13.

The set screw 37 includes a socket 40 for receiving the head of a driver tool. In the embodiment of FIG. 1, the socket 40 is shown as rectangular, but it could also be hexagonal, or some other shape of a type known for torque driving tools.

When the set screw 37 is driven to its innermost position it secures pieces 23, 24 in place where they are located. When the set screw 37 is rotated outward from this position, the carrier 23, 24 is in an unlocked, slidable condition. The interfaces between the top surface 28 of the base 23, the bottom surface 39 of the magnet holding body 24, and the rails 29, 30, are provided with sufficient clearance, so that there is play between the parts, when in the unlocked condition.

To assemble the rotor assembly, a fiberglass or graphite band 41, seen in FIGS. 1 and 2, is positioned in the air gap 42 where it will surround the rotor assembly after the magnets 34 are positioned in the slots 13. A magnet assembly 22 is positioned on an auxiliary carrier 50 (FIG. 2) which has guide rails 51 of non-magnetic material that can be aligned with the rotor teeth 12. The auxiliary carrier 50 is brought flush against the rotor core 11 and teeth 15, 16. A push-pull rod 52 has a threaded tip that is screwed into a threaded bore 53 in the body 24 of the magnet carrier. The push-pull rod 52 is used to push the magnet assembly 22 off the auxiliary carrier 50 and into the slot 13 and down the slot 13 to a desired position where it is beneath the non-metallic band 41. An auxiliary driver is then used to rotate and advance the set screw 37 to a position to secure the assembly 22 in position. The push-pull rod 52 can then be unscrewed from the body 24, and readied for attachment to the next magnet assembly 22. It should be apparent that more than one magnet assembly 22 could be assembled into an individual slot 13.

The method of the present invention can also be used to disassemble a rotor assembly for repair or maintenance. The auxiliary carrier 50 is brought flush against the rotor core 11 and teeth 15, 16. The push-pull rod 52 is threadingly attached to the bore 53 in the body 24 of the magnet carrier. The set screw 37 is loosened to allow movement of the magnet assembly 22. The push-pull rod 52 is used to pull the magnet assembly 22 out of the slot 13 and onto the auxiliary carrier 50. The push-pull rod 52 can then be unscrewed from the body 24, and readied for attachment to the next magnet assembly 22.

This has been a description of the preferred embodiments. It will be apparent to those of ordinary skill in the art that various modifications can be made without departing from the spirit and scope of the invention. Therefore, reference is made to the claims which follow for defining the legal scope of the invention.

We claim:

1. A permanent magnet assembly comprising:

a permanent magnet;

a carrier for the permanent magnet, said carrier including a base and a body which are loosely coupled together and slidable down a slot in a rotor, the permanent magnet being securely attached on top of the body; and a securing device inserted between said base and said body and movable between a first position in which said carrier is unsecured and slidable, and a second position in which said carrier is secured against further movement in the slot.

2. The permanent magnet assembly of claim 1, further comprising a threaded bore in said body for receiving a push-pull tool.

3. The permanent magnet assembly of claim 1, wherein said base and said body of said carrier meet along sloped surfaces relative to a bottom of the slot.

4. The permanent magnet assembly of claim 3, wherein the bottom surface of the body and the top surface of the base have opposing and longitudinally extending mortise slots formed therein; and further comprising a plurality of longitudinally extending rails which are received in the mortise slots to couple the body to the base.

5. The permanent magnet assembly of claim 3, wherein a bore is formed in said base, said bore being parallel to said sloped surfaces of said body and said base; and wherein said securing device is a set screw threadingly engaged in said bore.

6. The permanent magnet assembly of claim 5, wherein sloped surfaces slope downward in a direction into the slot in the rotor;

wherein said set screw has a plurality of threaded sections spaced along a length of said set screw and alternating with a plurality of circumferential grooves; and wherein said body has a plurality of projections which extend into corresponding ones of said grooves to cause the body to be moved with the axial movement of the screw, said body also moving in a radially inward direction in the slot in the rotor as the body is moved down the sloped surface of the base until the body is secured in position against the teeth of the rotor.

* * * * *